United States Patent Office 2,876,160
Patented Mar. 3, 1959

2,876,160

STARCH MATRIX MATERIAL CONTAINING IMBEDDED MATERIAL AND PROCESS FOR PREPARING SAME

Thomas J. Schoch, La Grange, and Charles C. Spencer, La Grange Park, Ill., assignors to Corn Products Refining Company, New York, N. Y., a corporation of New Jersey No Drawing. Application July 26, 1954
Serial No. 445,912

22 Claims. (Cl. 167—82)

This invention relates to a method of dispersing various materials, and more particularly water-insoluble materials, in solutions of specific starches or derivatives thereof, and then drying the resultant dispersions in order to produce new and novel dry products in which the dispersed phase is imbedded in a starchy matrix and is protected from air oxidation, chemical changes, evaporation, and the like.

There is frequent need to protect liquid and solid substances, for example, to avoid toxic contact with the skin, or to prevent deterioration such as may be caused by air oxidation or evaporation. As one instance of such changes, it is not generally practicable to supplement poultry feeds by spraying the latter with beta-carotene concentrates, since the useful carotene pigment is rapidly bleached out by subsequent exposure to air and to light. Similarly, the manufacturers of packaged desserts have found it necessary to enclose flavoring oils in a gelatin capsule to prevent loss of flavor or development of off-flavors. Another instance is the protection of vitamin A by elaborate processes of coating the vitamin with an air-impermeable film. One of the more common methods now in use emulsifies the vitamin A (either as an oil concentrate or as the melted acetate) in a warm solution of gelatin. This emulsion is in turn emulsified in a vegetable oil to give a polyphase dispersion, which is then allowed to cool below the gelation point of the gelatin. The spherical globules of the latter are then separated from the oil phase and dehydrated with alcohol, to give dry particles of gelatin containing imbedded spherules of the vitamin (U. S. Patents Nos. 2,183,084; 2,182,592; 2,183,053).

A multitude of other instances may be cited, and for many of these, it is not economically feasible to resort to such complex processing, as described above for vitamin A. There is need for a simple and inexpensive means of protecting such materials as insecticides, dry spices and spice oils, medicinals and diet supplements, fatty substances subject to rancidity changes, and the like.

It is an object of the present invention to provide a method whereby various materials may be protected against physical and chemical deterioration. It is a further object to provide a method for imbedding water-insoluble liquids or solids in a continuous starchy matrix, such that the liquid or solid is finely dispersed through and surrounded by the starchy matrix. Still a further object is to provide new products which are stable against physical or chemical changes. Yet another object is to provide a method for dispersing a liquid in a dry matrix such that the final product will be in a powdered free-flowing form. Other objects will appear hereinafter.

We have found a new and novel method to provide the necessary protection for liquids and solids against physical and chemical deterioration. For example, by means of our invention, we can provide a barrier against deterioration by atmospheric oxygen in the case of vitamin A or its derivatives. The precursor of vitamin A in xanthophyll oil, for example, can be protected so it may be added to poultry feed without loss of the vitamin values.

By means of our invention, it is possible to dilute highly active medicinals, or mixtures of medicinals, to a safe and uniform dilution. Our method of dilution is advantageous over mere dry-blending with a diluent since each particle in our finished product represents a uniform dispersion of the medicinal in the starch used.

Our invention permits the packaging of liquid substances in dry form, such that the liquid is immobilized behind a barrier of starch substance to prevent bleeding or staining, or to hinder evaporation of volatile substances, or to provide a product which may be handled more conveniently than prior art products. For example, our invention may be used to produce free-flowing shortenings for bakery goods by enclosing the emulsified liquid oil or melted fat in a starchy matrix.

Another example of an application of our invention is in the insecticide field. A solid or liquid insecticide may be surrounded by a starchy matrix and reduced to powdered form. Such powder can be dusted on fields. Subsequent contact of the individual particle with rain or dew would partially dissolve or swell the starchy matrix, causing it to adhere to the plant.

Yet another application of our invention is for those uses where it is necessary to reconstitute a stable colloid by dissolution in water. For example, a cold-water paint can be made by uniformly dispersing an insoluble pigment in a suitable starchy matrix. This material will reconstitute with water to give a paint of a uniform shade.

Liquids and solids which are toxic to the skin may be imbedded in a starch matrix in accordance with our invention and thus be more readily handled. Also mutually reactive agents may be imbedded in separate starch matrices, the dried materials mixed and stored, chemical reaction taking place when the dry mixture is wetted with water. In fact, our invention is useful in protecting any material which is compatible with, i. e., is not adversely affected by, aqueous starch referred to hereinafter.

In general, the process of our invention comprises making a solution of a starchy material to be defined hereinafter, uniformly dispersing therein the material which it is desired to protect, and then drying the dispersion. Optionally a plasticizer may be used to produce a less friable dry product, and a surface-active agent may be used to assist dispersion when a liquid is being treated. In general, as contemplated in this invention, the mechanism of encasing a dispersed phase of a finely divided liquid or solid with an impervious film requires that the starchy material be of relatively high molecular weight, be molecularly dispersible in water, and have the ability to maintain dispersed material in stable suspension. Such a starchy material should likewise exhibit low retrogradation tendencies in solution, and the dried films therefrom should exhibit a certain mechanical strength and coherence. A starchy substance which separates as an insoluble phase from solution before or during drying of the film is not satisfactory, as will be apparent from the text which follows hereinafter. Finally, for practical reasons, the starchy substance should be capable of dissolving in water to give solutions of relatively high concentration.

More specifically, the starchy materials (including starch derivatives) satisfactory for purposes of the present invention are those which possess the following five properties:

(1) The starchy material should be capable of being dissolved by cooking to give a solution or dispersion in which the individual starchy molecules are substantially mono-dispersed. Optimum benefits of this invention will not be realized if any substantial portion of the starchy material persists as swollen but undissolved granules or as fragments of such swollen granules. Those versed in the art will be able to judge whether this specification has been met by such means as inspecting the hot cooked starch paste under the phase microscope (when no significant portion of swollen granules or fragments should be visible), or by centrifuging the hot cooked paste (when there should be no substantial precipitate of insoluble material). Under ordinary conditions of cooking, unmodified corn and potato starches do not permit realization of the benefits of this invention, since too much of the total starch substance persists as swollen granules or fragments thereof. Obviously, if any substantial amount of swollen granules or fragments persists, these will be detrimental to the final starchy matrix in two respects: (a) this material will represent material which is not functioning to enclose a dispersed phase in the matrix; and (b) the presence of such discontinuities will weaken the final dried film or matrix, creating fissures which are detrimental to the effectiveness of its protection.

(2) The aqueous starch system must also act as a good suspending agent or protective colloid for the dispersed phase of liquid droplets or of solid particles. Those skilled in the starch art with the aid of simple preliminary tests will readily differentiate between those starch systems which are good protective agents and those which are not. However, in elucidation of this concept of protective colloid action, it is not contemplated, for example, that the dispersed phase shall merely be dispersed through a 5 to 7 percent paste of swollen corn starch granules, i. e., a cooked paste of raw corn starch, since such a dispersion would be maintained primarily by the presence of swollen granules, in contravention of qualification 1 above. Such a system would not produce a film which would enclose and bind the individual particles of the dispersed phase. The ineffectiveness of such a system is illustrated in Example 1, described hereinafter.

(3) The starchy substance should give a stable non-retrograding solution, i. e., it should show little or no tendency to precipitate from solution as insoluble microparticles. Such retrograded starchy material does not contribute to the starchy matrix and in addition weakens the continuity of this matrix, thus diminishing its protective action. As a criterion of absence of retrogradation, the starchy substance should give a substantially clear solution and should dry down to a flake or film which likewise possesses good clarity. Such a starch will function effectively in this invention, assuming other stipulations are likewise met, as specified herein.

(4) The starchy substance by itself must be one which can be dried down from solution to give a coherent film or flake which is stable and free-flowing, with no tendency either to powder or to form a sticky gum. This quality may be readily established by the simple test of plating out a solution of the starch substance on glass and allowing this film to dry spontaneously at room temperature. It is believed that this property requires that the starchy substance must possess high-polymeric molecular size in order to impart the requisite structural strength and non-hygroscopicity to the film or flake. Thus in Example 1, a partially hydrolyzed corn starch of 16–18 dextrose equivalent gives excellent protection to xanthophyll oil. This same material has an intrinsic viscosity of 0.04 in normal potassium hydroxide solution, and yields a strong red or plum coloration with iodine, which properties may be indicative of a molecular weight of 20–30 glucose units. More important for purposes of defining the starches which are effective in the present invention, this 16–18 D. E. product dries down from solution to give a strong coherent film which is neither powdery nor gummy. In contrast, ordinary 42 D. E. corn syrup dries down to a soft gummy hygroscopic film and hence does not fulfill the stipulated requirement. In addition, corn syrup does not provide adequate protective colloid action as specified above. However, as will subsequently be shown, corn syrup does have usefulness in the present invention as a plasticizer for the primary high-polymeric starchy material.

5. The starchy substance should be soluble in hot water to give solutions of high solids content. The concentrations which have been employed in the practice of this invention have ranged from 0.5–4.0 parts of water per part of starch, depending on the viscosity of the particular starch substance used. While not definitive nor restrictive, the viscosities of the hot cooked starch solutions herein employed have usually been in the region of 15–50 centipoises. More dilute systems can be employed, but some of the useful advantages of this invention will thereby be depreciated. Diluted starch solutions (even where the starchy substance is of a preferred type) do not maintain the dispersed liquid or solid material in stable suspension. Also, there is the added cost of evaporating large quantites of water.

Among the starchy substances which are satisfactory for purposes of this invention are the following general types:

A. The torrefaction or roasted dextrins (variously designated as canary dextrins, yellow dextrins and British gums), which show high solubility in cold water (i. e., usually 80 percent or above), high solution stability (i. e., minimum retrogradation, precipitation and "set-back"), and a very low content of linear starch substance (i. e., as qualitatively indicated by the absence of blue color with iodine; these products usually give red or plum colorations).

B. Thin-boiling oxidized starches, commercially produced by oxidation with hypochlorite or perxoide, especially those having a Scott hot paste viscosity of about 90 to about 45 (on the basis of 100 grams of starch in 280 ml. of water). These starches yield clear stable solutions, with minimal precipitation or "set-back."

C. The etherified starches, including the hydroxyethyl, hydroxypropyl, methyl and ethyl derivatives of low or moderate degree of substitution (D. S. of 0.04 to 0.25 ether groups per glucose unit). In addition, these products should be rendered thin-boiling by acid-modification or oxidation prior to or after derivatization, in order to assist dissolution of granule structure and to permit use of higher starch concentrations. A suitable degree of thinning would correspond to a 5-gram alkali fluidity of about 60 to 90, as measured by the well-known method of Buel (8th Int. Congr. Pure Applied Chem., Orig. Com., 13, 63 (1912)).

D. Starch esters, for example, the slightly acetylated starches described by Cross, Bevan and Traquair (Chem.-Zeit., 29, 527–528 (1905)), or commercially available products described as mixed carboxylic and sulfonic esters of corn starch. To assist dissolution of the granule, the starch esters should be at least moderately thin-boiling, for example, an acetylated starch having a 5-gram alkali fluidity of 56, or a sulfocarboxylic ester marketed under the trade mark of "NuFilm" and having a 5-gram alkali fluidity of 26.

E. Starches which are naturally devoid of a linear fraction, such as waxy maize or waxy sorghum starches. To assist dissolution of the granule and to permit use of higher starch concentrations, these starches should be rendered thin-boiling by appropriate means, e. g., by acid or enzyme hydrolysis, or by oxidation or dextrinization. A minimum degree of such thin-boiling conversion would correspond to a 5-gram alkali fluidity of about 50.

F. Converted starch products within the range of from approximately 4 D. E. to approximately 20 D. E., produced by acidic or enzymic hydrolysis, having high solubility in cold water, the solutions showing good stability against retrogradation, and giving no blue coloration with iodine (suitable products give red to plum colors).

Also, combinations of the above types may be employed, for example, a hydroxyethyl torrefaction dextrin, or a product prepared by dextrinizing an 18 D. E. hydrolyzed starch. Also, the parent starch may be derived from corn (maize), tapioca, wheat, rice, sorghum, sago, potato, arrowroot, waxy maize, waxy sorghum, or mixtures thereof. The above list is merely illustrative of the various types of starchy substances which may be used for purposes of the present invention and is by no means exclusive, the intent being to include all starchy substances which meet the five requirements previously cited. The term "starchy substance" as used herein and in the claims is intended to include those varieties, modifications and derivatives of starch which meet the aforementioned requirements.

In further elucidation and characterization of the requisite starchy substances, the following groups of modified starches have been found to be relatively ineffectual and these products are therefore considered outside the purview of this invention:

G. Unmodified starches: Even on prolonged cooking, the swollen granules do not break down to give a molecularly dispersed solution. If a vitamin oil is dispersed in such a cooked starch paste and examined under the microscope, the oily droplets will be found to be merely interspersed between the swollen granules and not surrounded by a solution of the starchy substance. Hence such systems provide little or no protection to the dispersed phase. Also, it is not possible to cook these starches at the high solids concentrations necessary for realization of the benefits of this invention.

H. Chemically cross-bonded or "inhibited" starches, for example, derivatized with phosphorus oxychloride to give ester bridges, or with epichlorohydrin to give ether cross-linkages. Such starches (even when of waxy origin) retain their swollen granule structure on prolonged cooking and hence do not give a molecularly dispersed solution suitable for use in this invention.

I. Thin-boiling acid-modified starches: Examination of pastes of these starches with the phase microscope shows that the greatly swollen granules tend to persist even after prolonged cooking and do not disintegrate to give a molecularly dispersed solution. In addition, these starches show pronounced retrogradation tendencies, giving insoluble precipitates which defeat the purpose of this invention. However, as noted in Type E above, the thin-boiling waxy starches do function effectively in this invention by virtue of the ready dissolution of granule structure and their freedom from retrogradation.

J. White dextrins: This group of common commercial products can be cooked up to give molecularly dispersed solutions of high solids content. However, such solutions show exaggerated retrogradation tendencies, tending to precipitate out of solution or to give "mushy" pastes or hard gels. These characteristics are not in accord with the purposes and requirements of this invention. However, it should be noted that white dextrins produced from the waxy starches would not exhibit these undesirable characteristics and hence would be within the scope of Type E above. Similarly, the product corresponding to a white dextrin of a hydroxyethyl corn starch would possess the requisite five qualifications above cited and hence would be within the scope of Type C.

K. So-called corn syrups, with a D. E. range from about 30 to about 60 (on dry substance basis): These products are converted beyond the point where they provide adequate protective colloid action to the dispersed phase. For example, low concentrations of vitamin oil can be temporarily emulsified in 42 D. E. corn syrup by vigorous agitation, but the microscope shows a continual and progressive coalescence of oil droplets. Moreover, such systems are extremely difficult to dry, and the products are highly hygroscopic. Even when dried under special laboratory conditions, the dispersed oil tends to bleed out of the product. However, it should be noted that corn syrups in this D. E. range may be useful adjuncts in conjunction with starch products of Type A to Type F, inclusive. In these instances, the corn syrup merely functions in a secondary role as a plasticizer for the starchy substance, and it is the starch which provides the five requirements previously defined. Even when corn syrup is so used as a plasticizer, its proportion should not be excessively high, or the undesirable qualities of the corn syrup may over-balance the useful properties imparted by the starch.

Although the incorporation of a starch plasticizer is not absolutely essential to the success of this invention, its judicious use may give a dried product of somewhat less friable character and enhance the protective character of the matrix. Suitable plasticizers include calcium chloride, glycerol, glycol, urea, dicyandiamide, ammonium thiocyanate, formamide, maltose syrups and corn syrup (glucose syrup). Choice of a specific plasticizer will depend on such factors as the following: (1) the plasticizer must be compatible with the dispersed phase, for example, it should not react detrimentally with the dispersed substance; (2) it should not interfere with the contemplated end-use, for example, an acceptable plasticizer should be employed where the final product is to be used in foods; (3) it should be chosen in accordance with the type of protection desired, for example, use of a plasticizer is particularly desirable where protection against oxidative deterioration is involved.

Due to the large variety of contemplated products and end uses and the large variety of plasticizers available, it is not possible to set forth specific details concerning the type and amount of plasticizer to be used. Those skilled in the art will be able, with the aid of the information disclosed herein and preliminary tests, to determine the necessity, type, and amount of plasticizer.

As one instance, several plasticzers were tested for the protection of xanthophyll oil in a matrix of hypochlorite-oxidized starch prepared according to Example 1; protection was judged by determining the proportion of neutral carotinoid surviving after heating at 75° C. for one week and for four weeks:

|  | Percent Carotinoid after Heating at 75° C. | |
| --- | --- | --- |
|  | For 1 Week | For 4 Weeks |
| No plasticizer | 46 | 28 |
| 20% Glycerol | 34 | 15 |
| 20% Urea | 62 | 41 |
| 20% Corn syrup (on dry basis) | 62 | 44 |

(Note.—Percentage plasticizer calculated on starch basis.)

Hence, in this particular instance, it appears that glycerol is actually detrimental to the survival of oxygen-sensitive carotinoids, while urea and corn syrup are of very substantial benefit. Since there is some development of undesirable brownish coolr with urea, corn syrup has been employed in most xanthophyll oil formulations. The amount of plasticizer must likewise be suited to the particular use. In the same fashion, the percentage protection afforded to xanthophyll oil by an oxidized starch matrix with various amounts of corn syrup is as follows:

| Percent Corn Syrup [1] | Percent Carotinoid after Heating at 75° C. | |
| --- | --- | --- |
|  | For 1 Week | For 4 Weeks |
| None | 46 | 28 |
| 20 | 62 | 44 |
| 40 | 70 | 54 |
| 60 | 81 | 70 |
| 80 | 76 | 62 |

[1] As percentage corn syrup (dry basis) calculated on dry starch basis

While protection is improved with higher proportions of corn syrup, excessive amounts will yield sticky products which are not free-flowing at high humidities. In general, it is preferable to add the plasticizer to the cooked starch solution, since certain of these materials (e. g., glycerol and corn syrup) may impede dissolution of the swollen granules.

A special group of substances is excluded from this invention, though they are sometimes incorrectly referred to as "plasticizers" for starch. These comprise the softening and antigelling agents which act either by oily lubrication or by tieing up the linear starch fraction as an insoluble complex; these include such materials as mineral oil and paraffin waxes, soaps, tallows, sulfonated oils and the like. Such materials would represent a discontinuous phase in the starch coating, thereby impairing its impermeability and film structure.

To assist in emulsification, it may be advantageous to add an appropriate surface-active agent to the liquid before emulsifying into the starchy substrate. For example, a small amount of dispersing agent, e. g., the product obtained by condensing ethylene oxide on a polyoxypropylene base, markedly assists dispersion of the liquid phase. However, the choice of an emulsifier will depend on the specific product and intended use. For example, it must be compatible with both starch and dispersed phase. Or for use in a food product, the emulsifier must necessarily be acceptable from a food standpoint.

Here again, in view of the large variety of contemplated products and end uses and the large variety of surface-active agents available, it is not possible to set forth specific details concerning the type and amount of surface-active agent to be used. Those skilled in the art will be able, with the aid of the information disclosed herein and preliminary tests, to determine the necessity, type, and amount of surface-active agent.

As a general procedure in carrying out the invention, an apppropriate starch is suspended in water, and the mixture is thoroughly cooked to gelatinize and dissolve the starch granules. A plasticizer for the starch substance, of the type previously described, may be advantageously added and preferably after cooking the paste. The liquid or powdered solid material to be protected is then mixed into the starchy solution by suitable means to give a finely-divided emulsion or dispersion, which is subsequently dried in appropriate fashion. The recommended methods and possible variations of each step in this process will become apparent from the following discussion and from the cited examples.

The amount of water must be regulated to accommodate the particular starch, with the purpose of producing a final cooked solution of syrupy consistency. It is advantageous to have the viscosity as high as possible. Viscous concentrated starch solutions have a greater protective colloid action than diluted systems, preventing coalescence of liquid micro-droplets or sedimentation of dispersed solid particles. In part, this may be attributed to the effect of viscosity on rate of sedimentation, as expressed by Stoke's law. In preferred laboratory preparations herein described, which were dried by spreading on glass plates, the ratio of water to starch has been from 0.5:1 to 4:1. The same range is satisfactory for most industrial belt or drum dryers. A somewhat higher proportion of water must necessarily be used if the paste is to be spray-dried (as in Example 2 below). Hence, the proportion of water will be governed by the particular type of starch and the process of drying, as well as the requirement that sufficient water be used to effect substantially complete solution of the starch substance, as defined in the first qualification above.

The starchy substrate should be cooked until substantially all granule structure is broken down and dissolved. Usually the paste will go through a thick stage as the granules swell, followed by a marked thinning as the swollen granules are dissolved. For practical purposes, it is sufficient to cook at 95 to 100° C. until the viscosity is reduced to a minimum, a cooking time usually of 15 to 30 minutes with small batches. The mixture should be stirred throughout the gelatinization and cooking stages, to prevent the formation of lumps and to assist in the breakdown and dissolution of granule structure. The intention is to reduce the starchy substrate as far as possible to a mono-dispersed solution before addition of the solid or liquid suspended phase. Additional heating or even pressure-cooking may assist toward this end. Heat exchangers, such as the unit sold under the trademark "Votator" by the Girdler Corporation, may be used advantageously in the preparation of the starch solution.

When a satisfactory starchy substrate has been achieved, the desired liquid or finely-powdered solid material is gradually added with vigorous agitation to effect a uniform dispersion. In most instances, this addition may be made directly to the hot solution. However, certain vitamins are destroyed by heat, and the starch substrate must first be cooled to a safe temperature. Certain other materials solidify within the range of temperatures here employed; in such cases, it is advantageous to add the material at a temperature above its melting point, homogenize the mixture to produce a finely divided emulsion of the melted dispersed phase, then cool below the crystallizing temperature with continuous stirring. An instance is the dispersion of vitamin A acetate, which melts at about 56° C. In this case, the starch substrate is held at a temperature sufficiently high to melt the vitamin A acetate (e. g., 60° C.), the latter is added and emulsified, and the system then cooled to crystallize the vitamin.

On small laboratory batches, emulsification of liquids or melted solids can be effected with an ordinary high-speed propeller-type stirrer. With larger batches, some type of mechanical emulsifier or homogenizer is required to break down liquid globules to small dimensions. The state of dispersion can be readily determined by examining under the microscope. In general, it is preferred to effect a fairly uniform globule size in the range of 5 to 20 microns' diameter. Solids, of course, must be powdered to the desired dimensions before addition to the starchy substrate. In the course of emulsifying, considerable air may be whipped into the mixture. Since this may cause some deterioration of oxygen-sensitive materials during processing, the entire system may be enclosed and flooded with carbon dioxide or other inert gas during the operations of cooking the starch substrate and effecting the emulsification of the sensitive material. For example, this technique has been employed in processing vitamin A preparations, with substantial benefit in minimizing inactivation of the vitamin (see Example 3).

The system generally thickens up somewhat on addition and dispersion of the solid or liquid phase, assuming a consistency similar to that of a salad dressing. This creamy dispersion may then be dried in a variety of ways. As practiced on a laboratory scale, the cream may be spread in a thin layer (0.25 to 0.5 mm. thick) on glass plates, and allowed to dry spontaneously. This may have the disadvantage of permitting a slight deterioration of highly oxygen-sensitive materials, probably by absorption of atmospheric oxygen into the wet starch substrate during the slow drying. However, once the starch film is dried down, further deterioration is usually negligible. Optimum drying conditions can be achieved by applying the creamy emulsion to the surface of a stainless steel belt drier by means of a doctor blade or roll, said belt then passing through a drying tunnel against a countercurrent of warm dry air or inert gas. Under these conditions, drying is effected within a few minutes, thus minimizing the deterioration which may occur during slow spontaneous drying. Another method is spray-drying, which is somewhat less desirable when the dispersed liquid globules are sensitive to oxygen.

As obtained by drying on glass or on a stainless steel belt, the product is in the form of scales or flakes or as a continuous film. If these flakes are examined under the microscope, the imbedded liquid globules will be found to have the same dimensions as in the parent emulsion. If desired, the flakes or film may be readily crushed to required dimensions. Under optimum conditions, such a material shows no evidence of oiliness or wetness, even when it contains 25 to 30 percent of imbedded liquid. After crushing to pass a 30-mesh screen, as little as 1 to 3 percent of the total liquid component is exposed on the surface. With certain costly vitamin preparations, it may be economically advantageous to recover this small amount of exposed material before it is oxidized by washing with naphtha or similar hydrocarbon solvent. The products obtained by spray drying are impalpable powders.

When the final product is to be blended into a large bulk of other material, the creamy emulsion may be suitably admixed with this main bulk of material, followed by a drying operation on the composite material. An instance is the addition of corn xanthophyll oil to poultry feed, whereby the xanthophyll oil is first emulsified in a suitable starchy base, and the resulting cream sprayed on the dried or partially dried feed, to give a final blend containing 0.5 to 2.0 percent xanthophyll oil. If necessary, the composite feed may then be subjected to a further drying operation. The only requirement here is that contact with the feed shall not cause breakdown of the xanthophyll oil emulsion; stability of the latter may be assisted by increasing the viscosity of the starchy substrate.

The following examples, which are intended as typical and informative only and not in a limiting sense, will illustrate the process and products of this invention:

*Example 1*

This example shows a typical method for protecting xanthophyll oil in various starch matrices wherein drying is effected by flake drying.

One hundred parts of the indicated starch (containing 8 to 10 percent moisture) was slurried in the amount of water specified below, 25 parts of commercial corn syrup (glucose syrup of 43° Baumé and 42 percent dextrose equivalent) added, and the mixture cooked for 30 minutes at 95 to 100° C. with continuous agitation. The mixture was then cooled to 50° C. with stirring, and 40 parts of corn (maize) xanthophyll oil added, emulsification being effected by high-speed agitation with a propeller-type stirrer. After 10 minutes' agitation, microscopic examination showed the oil to be dispersed in uniform droplets about 10 microns in diameter. The creamy paste was then spread out in a thin layer on glass plates and allowed to dry overnight at room temperature. Two tests were employed to measure the efficiency of the starch matrix in immobilizing the xanthophyll oil. As an indication of the amount of unprotected xanothophyll, the dry flaked product was extracted by agitating with cold petroleum naphtha, and the carotinoid pigments in the naphtha estimated spectrophotometrically at 450 millimicrons' wavelength. In the following tabulation, this extractable pigment is expressed as percentage of the total carotene present, representing that portion of the xanthophyll oil not protected within the starchy matrix. As a more conclusive test indicating survival against oxidation, the dry flaked product was heated in an air oven at 75° C. for periods of one and four weeks (conditions known to be highly adverse to survival of oxygen-sensitive materials), and the residual carotinoid then determined, expressed as percentage of original content. Assay was by conventional means, i. e., digesting the sample in alcoholic potassium hydroxide, extracting with naphtha followed by spectrophotometric measurement at 450 millicrons, with calibration against pure recrystallized beta-carotene.

| Starch | Type | Parts Water | Percent Solvent Extract | Percent Survival at 75° C. | | Remarks |
|---|---|---|---|---|---|---|
| | | | | 1 Week | 4 Weeks | |
| Light canary corn dextrine, by roasting with acid catalyst. Solubles=97%. | A | 60 | 7 | 88 | | Very tight film. Micro-dispersed oil droplets. |
| 18 D.E. Corn starch hydrolysis product. Solubles=100%. | F | 70 | 22 | 79 | 79 | Hard tight film. |
| Light yellow corn dextrin, by roasting with acid catalyst. Solubles=98%. | A | 80 | 4 | 87 | 76 | Dried on heated metal plate. |
| Same | A | 80 | 3 | 84 | 74 | Same paste, but dried at room temperature. |
| British gum, tan in color, by roasting with acid catalyst. Solubles=80%. | A | 140 | 2 | 79 | 74 | |
| Dark yellow corn dextrin, by roasting with acid catalyst. Solubles=97%. | A | 50 | 9 | 82 | 73 | Micro-dispersed oil droplets. |
| 85-Fluidity waxy maize starch | E | 220 | 4 | 78 | 69 | |
| Light canary corn dextrin, by roasting with acid catalyst. Solubles=99%. | A | 70 | 5 | 76 | 68 | Alligator skin. |
| 18 D.E. corn starch hydrolysis product, subsequently dextrinized. Solubles=100%. | F-A | 50 | 6 | 79 | 66 | |
| British gum, by roasting corn starch with acid catalyst. Solubles=90%. | A | 120 | 6 | 71 | 60 | |
| 50-Fluidity thin-boiling waxy maize starch | E | 320 | 11 | 65 | 51 | Hard, very brittle flake. |
| 5 D.E. corn starch hydrolysis product. Solubles=95%. | F | 90 | 15 | 62 | 51 | Tight film. |
| 80-Fluidity hydroxyethyl corn starch, 0.05 D.S. | C | 300 | 6 | 68 | 46 | |
| 55-Scott hypochlorite-oxidized corn starch | B | 260 | 10 | 62 | 44 | |
| 26-Fluidity sulfonic-carboxylic starch ester | D | 420 | 9 | 75 | 40 | |
| Corn gum, light tan color, by roasting neutral starch. Solubles=10%. | A | 200 | 9 | 58 | 42 | Paste thickens on cooling, due to retrogradation. |
| 4 D.E. corn starch hydrolysis product. Solubles=95%. | F | 120 | 15 | 46 | 43 | Hard tight film. Slightly oily surface. |
| 90 Scott hypochlorite-oxidized corn starch | C | 260 | 12 | 56 | 39 | |
| 45-Fluidity acetylated corn starch, 1.8% esterified acetic acid. | D | 400 | 11 | 52 | 38 | Hard tight film. |
| Corn gum, light tan color, by roasting alkaline starch. Solubles=4%. | A | 300 | 25 | 43 | 36 | "Short" paste, gels on cooling, due to retrogradation. |
| Corn gum, light tan color, by roasting alkaline starch. Solubles=2%. | A | 720 | 9 | 41 | 35 | Retrograded paste. |
| Hydroxyethyl potato starch. 0.25 D.S. | C | 500 | 34 | 41 | 31 | Very tight film. |
| Low-converted oxidized corn starch | B | 360 | 20 | 38 | 22 | "Short" paste, non-uniform dispersion. |
| White dextrin, by heating acidified corn starch at 210° F. Solubles=23%. | J | 100 | 37 | 22 | 17 | |
| Corn gum. Solubles=4%. | G-A | 360 | 31 | 25 | 15 | "Short" paste. |
| 44-Fluidity acid-modified potato starch | I | 320 | 16 | 42 | 12 | |
| 75-Fluidity acid-modified corn starch | I | 260 | 35 | 25 | 13 | |
| White dextrin from corn starch. Solubles=65%. | J | 110 | 34 | 25 | 12 | Very tight opaque film. |

| Starch | Type | Parts Water | Percent Solvent Extract | Percent Survival at 75° C. 1 Week | Percent Survival at 75° C. 4 Weeks | Remarks |
|---|---|---|---|---|---|---|
| White dextrin from corn starch. Solubles=25%. | J | 120 | 37 | 15 | 8 | Tight film. |
| Corn gum, by roasting alkaline starch. Solubles=5%. | G–A | 260 | 47 | 18 | 0 | Paste thickens on cooling. |
| White dextrin from corn starch. Solubles=45%. | J | 120 | 41 | 15 | 0 | |
| White dextrin from corn starch. Solubles=4%. | J | 170 | 25 | 10 | 0 | |
| White dextrin from corn starch. Solubles=15%. | J | 140 | 74 | 0 | ---------- | |
| Unmodified corn starch | G | 1,000 | 89 | 13 (2 days) | ---------- | Oily film. |
| White dextrin from corn starch. Solubles=4%. | J | 180 | 100 | 1 (1 day) | ---------- | Do. |
| 90-Fluidity corn starch | I | 210 | 100 | 2 (2 days) | ---------- | Do. |
| Dry roll-gelatinized corn starch flakes sprayed with 20% xanthophyll oil. | | | 82 | 0 (1 day) | ---------- | |
| Bakery color (wheat flour with approximately 10% xanthophyll oil). | | | 100 | 2 (1 day) | ---------- | |

(*Note.*—Dextrin solubles determined by extracting with water at 25° C.).

In each instance, the general type of starch is identified with a letter (A to J) corresponding to the various classifications previously described. It will be noted that the 18 D. E. corn starch hydrolysis product and the various torrefaction dextrins provide optimum protection. Slightly less effective are the thin-boiling waxy starches, the thin-boiling hypochlorite-oxidized starches, and the thin-boiling ethers and esters. Inferior or negligible protection is afforded by the thin-boiling acid-modified potato and corn starches, the corn white dextrins, and the unmodified starches. The last two examples in the foregoing listing show the complete absence of protection when the xanthophyll oil is merely applied to the surface of the starch, indicating a vital difference between the present invention and the processes described by Evans in U. S. Patent No. 2,641,547 and by Stange in U. S. Patent No. 2,170,954. According to these two inventions, such materials as chicken fat or spice oils are merely coated on the surface of dry pregelatinized starch flakes, and there is no attempt to enclose and surround these added substances with an impervious barrier of starch. The last-mentioned example is a commercial product marketed to bakers to impart color to certain bakery goods.

The various modified starches show a wide spectrum of protective ability, depending on the extent to which each individual starch meets the five requirements herein stipulated. In several instances, the effectiveness of a particular product may seem out of line with its type of modification. For example, two torrefaction dextrins, indicated as G–A, show extremely poor protection (15 percent and 0 percent survival of pigment after four weeks at 75° C.). However, these so-called torrefaction dextrins are low-converted products, with only 5 percent cold-water solubles. Consequently, they retain much of the character of unmodified starch, including difficult solubility of the granules and pronounced retrogradation tendencies.

*Example 2*

This example shows a typical method of protecting xanthophyll oil in a starch matrix wherein drying is effected by spray-drying.

A mixture of 50 lb. of 55-Scott hypochlorite-oxidized corn (maize) starch, 12.5 lb. of corn syrup and 375 lb. of water was brought to a boil in a jacketed kettle equipped with propeller agitator, cooked for 15 minutes, and allowed to cool for 10 minutes. The larger proportion of water was necessary to reduce the viscosity of the system to a practicable level for spray-drying. A supplementary turbine-type homogenizer was then placed in the paste, and 12.5 lb. of xanthophyll oil was added. After mixing for 30 minutes, the globule size was not uniform, ranging from 5 to 50 microns. The emulsion was therefore passed through a pressure homogenizer (inlet pressure=5000 p. s. i., outlet=4000 p. s. i.) en route to the nozzle of a counter current spray drier. Temperature of the inlet air to the drier was 300° F., and feed rate was 0.72 gal. per minute. This gave a fine intensely-yellow powder, with a moisture content of 3 percent and a bulk density of 26 lb. per cubic foot. The oily phase was apparently microdispersed in process, and no oily globules could be distinguished under the microscope at 500 diameters' magnification. Extraction of this material with cold petroleum naphtha removed 5 percent of the total carotinoid. After aging at 75° C. for one and four weeks, the amounts of surviving carotinoid were 69 percent and 21 percent, respectively. In this instance, spray-drying did not give quite as much protection against oxygen as flake-drying, probably due to extremely fine dispersion of the oil.

*Example 3*

This example shows protection of vitamin A.

A mixture of 50 grams of 55-Scott hypochlorite-oxidized corn (maize) starch, 12.5 grams of commercial corn syrup and 120 ml. of water was cooked at 95 to 100° C. for 15 minutes, then cooled to 40° C., continuous agitation being maintained throughout. During the cooling period, the paste was flooded with carbon dioxide to displace air. When the temperature reached 40° C., 10 grams of a commercial concentrate of vitamin A palmitate in oil (containing 1,000,000 U. S. P. units per gram) was added in rapid dropwise fashion to the paste, with vigorous agitation to effect emulsification. Flooding with carbon dioxide was continued during this stage. After uniform emulsification had been achieved, the sample was coated on a glass plate and allowed to dry overnight at room temperature, to give lustrous lemon-yellow flakes. A similar preparation was also made using 50 grams of 85-fluidity waxy maize starch. Microscopic examination of the dried flakes showed that considerable crystallization of the vitamin A palmitate had occurred within the individual oil globules. Vitamin assays were run on the initial dried products, and likewise after aging at room temperature for 3 weeks and for 3 months. Vitamin content was determined by the 1945 A. O. A. C. method, expressed in U. S. P. units per gram.

| Time of Aging | With Hypo-chlorite-Oxidized Starch | With 85-Fluidity Waxy Maize |
|---|---|---|
| Initial | 116,000 | 109,000 |
| 3 Weeks | 101,000 | 105,000 |
| 3 Months | 106,000 | 118,000 |

Approximately 25 percent loss of potency was apparently incurred during flake-drying, probably due to absorption of atmospheric oxygen by the wet paste during the slow drying period. However, the dried product was completely stable at room temperature, within the accuracy of the assay method.

*Example 4*

This example illustrates dilution of aniline-trinitrobenzene complex in a starch matrix. The aniline-trinitrobenzene complex is a crystalline solid claimed to have merit as a rodent repellent. When diluted down in various media, it tends to bleach out on exposure. The following procedure was employed to give stable dilutions of 1 percent, 15 percent and 25 percent of this material. A mixture of 50 grams of 55-Scott hypochlorite-oxidized corn (maize) starch, 12.5 grams of corn syrup and 130 ml. of water was cooked until a homogeneous solution was attained. The aniline trinitrobenzene complex was finely powdered, and 0.6 gram of this material was stirred into the starch substrate to give a smooth and uniform dispersion, which was then dried out on a glass plate. Similar preparations were made with 10-gram and 20-gram additions of the complex. All three preparations were stable on storage over a period of several months as shown by no loss in color. An interesting feature is that these preparations (unlike the parent complex) had little or no odor, indicating immobilization of the complex.

*Example 5*

This example illustrates the incorporation of shortening in a dry, free-flowing starch matrix. Fifty grams of 55-Scott hypochlorite-oxidized corn (maize) starch was suspended in 120 ml. of water, cooked at 95° C. for 15 minutes with agitation, and 37.5 grams of regular corn syrup added. Twenty ml. of melted vegetable shortening (sold under the trademark "Crisco") was then emulsified into the paste which was subsequently coated and dried on glass plates. Similar preparations were made, but with the addition of 40 ml. and 60 ml. of the melted shortening. The dried products containing 20 and 40 ml. of fat were free-flowing and lacking in superficial "greasiness," while the product containing 60 ml. showed evidence of extraneous fat. Benzene extraction of the three samples removed 12 percent, 33 percent and 64 percent of the total fat, respectively. By means of this particular formulation as much as 32 percent of shortening (on the basis of the total composition) may be incorporated in a starch matrix to give a free-flowing and non-greasy dry shortening.

This application is a continuation-in-part of application Serial No. 378,419, filed September 3, 1953, now abandoned.

We claim:

1. A process of imbedding a water-insoluble material in a protective starch matrix in dry, free-flowing form to protect said material against chemical and physical changes, which comprises effecting a substantially complete solution of a chemically-modified starch, dispersing said material in said solution and drying the resultant dispersion and subdividing the dried product; said chemically modified starch having the following required characteristics: (1) being substantially completely soluble upon cooking in water to give a solution in which substantially no portion of the starch is present as swollen granules and fragments thereof, (2) having sufficient protective colloidal capacity to prevent any aggregation, separation and coalescence of the dispersed water-insoluble material, (3) forming clear aqueous solution substantially stable against retrogradation, (4) being capable of forming a coherent stable non-gummy film on being dried from aqueous solution, (5) having been suitably modified to yield aqueous solutions of considerably lower viscosity than pastes of untreated starch; said material being compatible with the aqueous starch system.

2. Process according to claim 1 wherein a plasticizer is added prior to the drying step.

3. Process according to claim 1 wherein an emulsifier is added to assist dispersion of said material.

4. Process according to claim 1 wherein said starch is a torrefaction dextrin.

5. Process according to claim 1 wherein said starch is a starch hydrolyzate having a D. E. value of about 4 to about 20 percent.

6. Process according to claim 1 wherein the drying is effected by spray-drying.

7. Process according to claim 1 wherein the resultant dispersion is formed into a thin layer and then dried.

8. Process according to claim 1 wherein said dispersion is mixed with a dry material prior to the drying step.

9. A process of imbedding a water-insoluble material in a starch matrix in dry form which comprises cooking an aqueous slurry of starch with mechanical agitation at a temperature above the normal gelatinization temperature of the starch so as to obtain a clear solution in which the starch molecules are mono-dispersed, dispersing in said solution a water-insoluble material and drying the resultant dispersion; said starch being oxidized starch having a Scott hot paste viscosity of about 90 to about 45 on the basis of 100 grams of starch in 280 ml. of water; said insoluble material being not adversely affected by the aqueous starch system.

10. Process according to claim 9 wherein said starch is etherified starch having a 5-gram alkali fluidity of about 60 to about 90.

11. Process according to claim 9 wherein the starch is a starch ester from the group consisting of acetylated starches and mixed carboxylic-sulfonic esters of starch.

12. Process according to claim 9 wherein said starch is thin boiling waxy starch.

13. A composition of matter stable to physical and chemical changes and in dry, free-flowable form comprising a continuous starch matrix in which is dispersed and imbedded a material not adversely affected by water and said starch matrix, said material being otherwise agglomerating and non-free-flowing; said starch matrix consisting of a chemically modified starch having the following characteristics: (1) being substantially completely soluble upon cooking in water to give a solution in which substantially no portion of the starch is present as swollen granules and fragments thereof, (2) having sufficient protective colloidal capacity to prevent any aggregation, separation and coalescence of the dispersed water-insoluble material, (3) forming clear aqueous solutions substantially stable against retrogradation, (4) being capable of forming a coherent stable non-gummy film on being dried from aqueous solution, (5) having been suitably modified to yield aqueous solutions of considerably lower viscosity than pastes of untreated starch; said material being compatible with the aqueous starch system.

14. A composition of matter stable to physical and chemical changes and in dry, free-flowable form comprising a continuous starch matrix in which is dispersed and imbedded vitamin A, said starch matrix consisting of a chemically modified starch having the following characteristics: (1) being substantially completely soluble upon cooking in water to give a solution in which substantially no portion of the starch is present as swollen granules and fragments thereof, (2) having sufficient protective colloidal capacity to prevent any aggregation, separation and coalescence of the dispersed water-insoluble material, (3) forming clear aqueous solutions substantially stable against retrogradation, (4) being capable of forming a coherent stable non-gummy film on being dried from aqueous solution, (5) having been suitably modified to yield aqueous solutions of considerably lower viscosity than pastes of untreated starch; said material being compatible with the aqueous starch system.

15. The product of claim 14 wherein the vitamin A is in the form of its precursor as found in a xanthophyll oil.

16. The product of claim 14 wherein the starch substance is torrefaction dextrin.

17. The product of claim 14 wherein the starch substance is hypochlorite oxidized starch.

18. A composition of matter stable to physical and chemical changes and in dry, free-flowable form comprising a continuous starch matrix and a sensitive material which is dispersed and imbedded and protected therein, said starch matrix consisting of a chemically modified starch having the following characteristics: (1) being substantially completely soluble upon cooking in water to give a solution in which substantially no portion of the starch is present as swollen granules and fragments thereof, (2) having sufficient protective colloidal capacity to prevent any aggregation, separation and coalescence of the dispersed water-insoluble material, (3) forming clear aqueous solutions substantially stable against retrogradation, (4) being capable of forming a coherent stable non-gummy film on being dried from aqueous solution, (5) having been suitably modified to yield aqueous solutions of considerably lower viscosity than pastes of untreated starch; said material being compatible with the aqueous starch system.

19. The product of claim 18 wherein the starch substance is torrefaction dextrin.

20. The product of claim 18 wherein the starch substance is hypochlorite oxidized starch.

21. A composition of matter stable to physical and chemical changes and in dry, free-flowable form comprising a continuous starch matrix and an oxygen sensitive material which is dispersed and imbedded and protected therein, said starch matrix consisting of a chemically modified starch having the following characteristics: (1) being substantially completely soluble upon cooking in water to give a solution in which substantially no portion of the starch is present as swollen granules and fragments thereof, (2) having sufficient protective colloidal capacity to prevent any aggregation, separation and coalescence of the dispersed water-insoluble material, (3) forming clear aqueous solutions substantially stable against retrogradation, (4) being capable of forming a coherent stable non-gummy film on being dried from aqueous solution, (5) having been suitably modified to yield aqueous solutions of considerably lower viscosity than pastes of untreated starch; said material being compatible with the aqueous starch system.

22. A composition of matter stable to physical and chemical changes and in dry, free-flowable form comprising a continuous starch matrix and a volatile material which is dispersed and imbedded and protected therein, said starch matrix consisting of a chemically modified starch having the following characteristics: (1) being substantially completely soluble upon cooking in water to give a solution in which substantially no portion of the starch is present as swollen granules and fragments thereof, (2) having sufficient protective colloidal capacity to prevent any aggregation, separation and coalescence of the dispersed water-insoluble material, (3) forming clear aqueous solutions substantially stable against retrogradation, (4) being capable of forming a coherent stable non-gummy film on being dried from aqueous solution, (5) having been suitably modified to yield aqueous solutions of considerably lower viscosity than pastes of untreated starch; said material being compatible with the aqueous starch system.

References Cited in the file of this patent
UNITED STATES PATENTS

| | | |
|---|---|---|
| 2,170,954 | Stange | Aug. 29, 1939 |
| 2,183,053 | Taylor | Dec. 12, 1939 |
| 2,314,459 | Salzburg | Mar. 23, 1943 |
| 2,396,592 | Moller | Mar. 12, 1946 |
| 2,431,497 | North et al. | Nov. 25, 1947 |
| 2,641,547 | Evans | June 9, 1953 |
| 2,694,643 | Robinson et al. | Nov. 16, 1954 |
| 2,694,688 | Fricke | Nov. 16, 1954 |

OTHER REFERENCES

"The Water-Soluble Gums," 1947, by Mantell, published by The Reinhhold Publishing Corp. (New York), p. 163.

UNITED STATES PATENT OFFICE

CERTIFICATE OF CORRECTION

Patent No. 2,876,160                                                March 3, 1959

Thomas J. Schoch et al.

It is hereby certified that error appears in the above numbered patent requiring correction and that the said Letters Patent should read as corrected below.

In the grant, lines 2 to 4, for "assignors to Corn Products Refining Company, of New York, N. Y., a corporation of New Jersey," read -- assignors to Corn Products Company, a corporation of New Jersey, --; line 13, for "Corn Products Refining Company, its successors" read -- Corn Products Company, its successors --; in the heading to the printed specification, lines 6 to 8, for "assignors to Corn Products Refining Company, New York, N. Y., a corporation of New Jersey" read -- assignors to Corn Products Company, a corporation of New Jersey --.

Signed and sealed this 20th day of October 1959.

(SEAL)
Attest:

KARL H. AXLINE

Attesting Officer

ROBERT C. WATSON
                                                                                             Commissioner of Patents